July 18, 1967 W. J. EGGINGTON 3,331,461
AIR CUSHION BORNE VEHICLES HAVING ENDLESS FLEXIBLE TREADS
Filed Sept. 2, 1964 2 Sheets-Sheet 1

Inventor
Wilfred James Eggington
By
Pennie, Edmonds, Morton, Taylor & Adams
Attorneys July 18, 1967  W. J. EGGINGTON  3,331,461
AIR CUSHION BORNE VEHICLES HAVING ENDLESS FLEXIBLE TREADS
Filed Sept. 2, 1964  2 Sheets-Sheet 2

Inventor
Wilfred James Eggington
By
Pennie Edmonds Morton Taylor & Adams
Attorneys

# United States Patent Office 3,331,461
Patented July 18, 1967

3,331,461
AIR CUSHION BORNE VEHICLES HAVING
ENDLESS FLEXIBLE TREADS
Wilfred James Eggington, Buffalo, N.Y., assignor to
Vicker-Armstrong (Engineers) Limited, London, England, a British company
Filed Sept. 2, 1964, Ser. No. 393,936
Claims priority, application Great Britain, Sept. 12, 1963, 36,073/63
5 Claims. (Cl. 180—7)

This invention relates to air cushion borne vehicles.

According to the present invention there is provided a vehicle having a vehicle body that is arranged for receiving support directly or indirectly from an air cushion, when formed, in an enclosed space beneath the vehicle body, said space being within an endless band of flexible material that has top and bottom runs extending in the front to rear direction of the vehicle and front and rear portions joining the top and bottom runs and respectively projecting forwardly and rearwardly from said runs, the bottom run of the band serving to close the bottom of said space and to bear on the surface over which the vehicle travels, there being longitudinally extending flexible skirts effectively carried by the vehicle body for minimising lateral escape of air from the longitudinal sides of said space, and a transverse flexible skirt, also effectively carried by the vehicle body, extending in a direction across the width of the vehicle at each end of said space for minimising escape of air from each end of the space.

Figure 1:
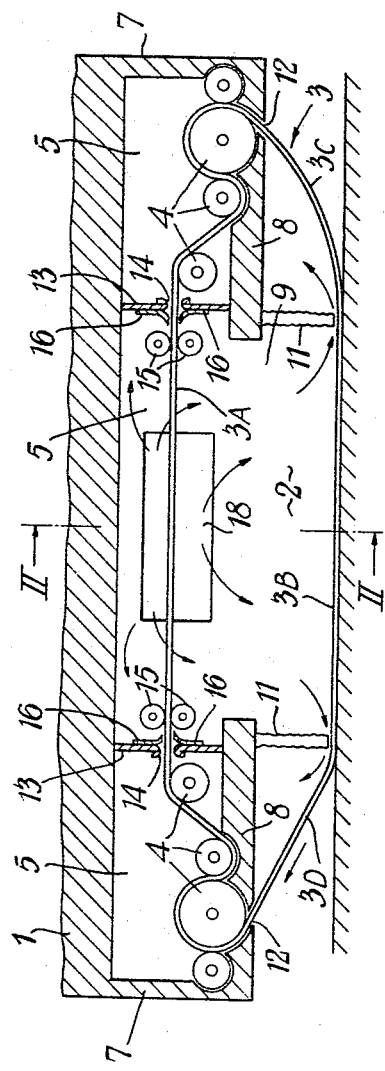
Figure 2:
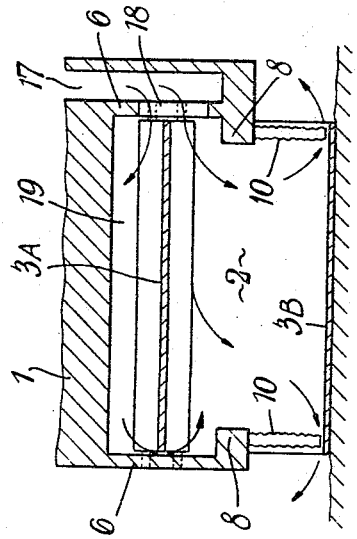
Figure 3:
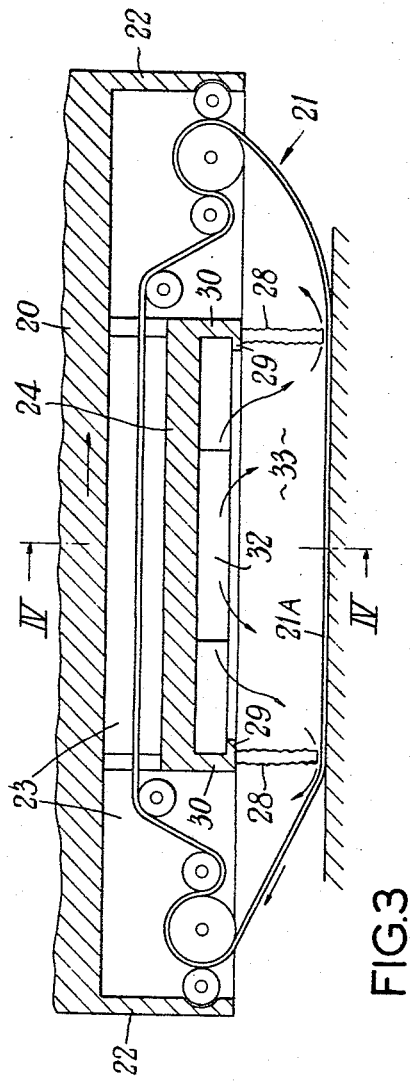
Figure 4:
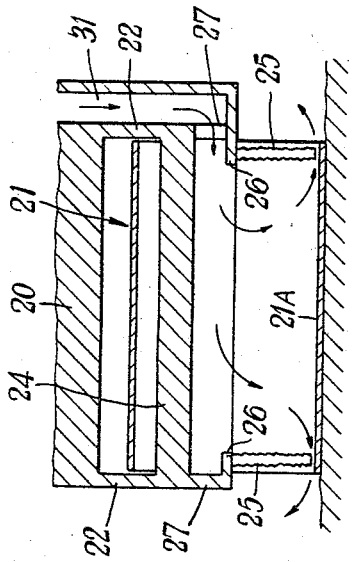

For a better understanding of the invention and to show how the same may be carried into effect, reference will now be made, by way of example, to the accompanying drawing, in which:

FIGURE 1 is a longitudinal sectional view of the lower part of an air cushion borne vehicle, FIGURE 2 is a section on II—II of FIGURE 1, FIGURE 3 is a longitudinal sectional view of part of another air cushion borne vehicle, and FIGURE 4 is a section on IV—IV of FIGURE 3.

The vehicle of FIGURES 1 and 2 has a body 1 that rides on an air cushion 2 that is within an endless flexible band 3 of rubber, synthetic rubber or similarly flexible material. The top and bottom runs 3A, 3B of the band 3 extent in the front to rear direction of the vehicle and are approximately horizontal. The top and bottom runs 3A, 3B are joined by front and rear portions 3C, 3D of the band 3 which portions are passed around rollers 4 carried by the vehicle body 1, the front and rear portions 3C, 3D respectively projecting forwardly and rearwardly from the runs 3A, 3B. The bottom run 3B of the band 3 bears on the ground or water over which the vehicle travels. The band 3 extends over substantially the whole length of the vehicle and over substantially the whole width of the vehicle. The top run 3A of the band is disposed in a cavity 5 formed underneath the vehicle body 1 by plate-like side members 6 and plate-like end members 7 depending from the two longitudinal sides and the two ends of the vehicle body 1. Horizontal flanges 8, disposed at the same level, extend inwardly from the lower edges of the plate-like members 6 and 7, the inner edges of the flanges 8 defining a rectangular opening 9 at the bottom of said cavity. Each flange 8 at the side of the vehicle carries a depending flexible side skirt 10 which extends the length of the approximately horizontal bottom run 3B of the band. The flanges 8 at the ends of the vehicle carry front and rear depending skirts 11 each of which is flexible and extends transversely of the vehicle from one side skirt 10 to the other side skirt 10 such that the four flexible skirts 10 and 11 together form a closed rectangle in plan view. The front and rear portions 3C, 3D of the band pass through slots 12 in the flanges 8 that are at the ends of the vehicle. A vertical partition 13 having a horizontal slot 14 in it extends from the inner edge of each end flange 8 to the top of the cavity 5. The top run 3A of the band passes through these two slots 14. Guide rollers 15 and flexible sealing strips 16 are provided adjacent each slot 14. A compressor (not shown) is mounted on the vehicle body 1 and is arranged to supply air via ducting 17 and an aperture 18 to the air cushion space within the band 3, which space is limited at the top by the top run 3A of the band, at the bottom by the bottom run 3B of the band, at its front and rear ends by the two transverse flexible skirts 11, the end flanges 8 and the bottom portions of the partitions 13, and at its longitudinal sides by the plate-like side members 6, the side flanges 8 and the side flexible skirts 10. Air from the compressor is also supplied via the ducting 17 and the aperture 18 to the space 19 between the top run 3A of the band and the underside of the vehicle 1. The vehicle rides on the air cushion 2 formed in the first-mentioned space, the vehicle load being transmitted to this cushion through the compressed air confined in the space 19.

The vehicle of FIGURES 3 and 4 has a body 20 supported above an endless flexible band 21 which is of the same shape as the band 3 of the vehicle of FIGURES 1 and 2. Plate-like members 22 depend from the periphery of the body 1 to form a cavity 23 beneath the body 1. A horizontal rectangular shaped platform 24 supported from the members 22 at the longitudinal sides of the vehicle is disposed within the band 21. Side flexible skirts 25 extend downwardly from inwardly directed flanges 26 carried on webs 27 depending from the two longitudinal sides of the platform 24 to contact, or be in close proximity with, the bottom run 21A of the band 21 which bears on the ground or water over which the vehicle travels. Front and rear flexible skirts 28 depend from inwardly directed flanges 29 carried on webs 30 depending from the remaining two sides of the platform 24 and their bottom edges also touch, or are close to, the band 21. A compressor (not shown) is mounted on the vehicle body 1 and supplies air via ducting 31 and an aperture 32 to the space within the band 21, which space is limited at its top by the platform 24, at its bottom by the bottom run 21A of the band, at its opposite ends by the front and rear flexible skirts 28 and at its longitudinal sides by the flexible skirts 25. The air supplied to the last-mentioned space forms an air cushion 33 which supports the platform 24 which in turn supports the vehicle body 1.

In both vehicles a motor (not shown) is provided which through appropriate mechanism is arranged for advancing the band 3, 21 around its own loop thereby to propel the vehicle. It will be understood that when the band 3 or 21 is being driven the bottom run thereof moves rearwardly or forwardly relative to the bottom edges of the four skirts 10 and 11, or 25 and 28.

Each vehicle has been described as having a compressor mounted on the vehicle body thereof. The compressor could, however, instead be carried on an accompanying coupled vehicle.

Although the vehicles mentioned above have been described as having one endless band enclosing an air cushion, it is to be understood that several bands may be provided each enclosing an associated air cushion. For example, the invention can be applied to a composite vehicle having steerable wheels at the front and at the rear a band on each side enclosing an air cushion. As a further example the invention can be applied to an articulated vehicle having a front part and a rear part, each carried by two side-by-side bands each enclosing an associated air cushion, the two parts being secured together by a coupling permitting relative pivotal movement of the two parts about three mutually perpendicular axes.

I claim:

1. A vehicle having front and rear ends and including a vehicle body, said vehicle being arranged for receiving support from an air cushion when formed beneath the vehicle body, means carried by the vehicle body enclosing an air cushion space, means mounted on said vehicle body externally of and in communication with said cushion space for delivering air to said enclosed space to form therein an air cushion providing support to the vehicle, wherein the improvement in the means for enclosing said air cushion space comprises an endless movable band of flexible material carried by the vehicle body having top and bottom runs extending in the front to rear direction of the vehicle and closing the top and bottom respectively of said space, said endless band having front and rear portions joining the top and bottom runs and respectively projecting forwardly and rearwardly from said runs, the bottom run of the endless band bearing on the surface over which the vehicle travels, said enclosing means also including longitudinally extending flexible skirts carried by the vehicle body located along and minimizing lateral escape of air from the respective longitudinal sides of said air cushion space between the runs of said band, and a flexible skirt carried by the vehicle body extending transversely of the vehicle across each end of said air cushion space for minimizing escape of air therefrom.

2. A vehicle as claimed in claim 1, wherein the top run of said endless band is spaced from the underside of the vehicle body and defines the bottom of a confined space between it and the vehicle body and also defines the top of said enclosed space containing said air cushion, and means for delivering air under pressure to said confined space above the top run of said endless band, whereby in operation of the vehicle the air in said confined space is carried on the air cushion and the vehicle load is transmitted to the air cushion through the air supplied to said confined space between the vehicle body and the top run of the endless band.

3. A vehicle as claimed in claim 2, including means associated with the body of the vehicle and cooperating with the top run of said endless band for enclosing the confined space between the top run of the endless band and the vehicle body.

4. A vehicle as claimed in claim 1, wherein said front and rear portions of the endless band extend downwardly to the bottom run of the endless band which is located adjacent the lower portions of said flexible skirts.

5. A vehicle as claimed in claim 1, wherein the enclosed space in which the air cushion is located extends substantially the entire width of the vehicle body.

References Cited

UNITED STATES PATENTS

| 809,048 | 1/1906 | Furchtbar | 305—34 |
| 3,095,938 | 7/1963 | Bertelsen | 180—7 |
| 3,261,418 | 3/1964 | Bertin | 180—7 |

A. HARRY LEVY, *Primary Examiner.*

BENJAMIN HERSH, *Examiner.*

M. S. SALES, *Assistant Examiner.*